(12) United States Patent
Ma et al.

(10) Patent No.: US 9,908,817 B2
(45) Date of Patent: Mar. 6, 2018

(54) MULTILAYER CAPACITORS, METHOD FOR MAKING MULTILAYER CAPACITORS

(75) Inventors: Beihai Ma, Naperville, IL (US); Uthamalingam Balachandran, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 743 days.

(21) Appl. No.: 13/528,544

(22) Filed: Jun. 20, 2012

(65) Prior Publication Data

US 2012/0257324 A1 Oct. 11, 2012

Related U.S. Application Data

(63) Continuation-in-part of application No. 12/786,940, filed on May 25, 2010, now Pat. No. 8,974,856.

(Continued)

(51) Int. Cl.
| | |
|---|---|
| C04B 35/00 | (2006.01) |
| C04B 35/491 | (2006.01) |
| C04B 35/624 | (2006.01) |
| C23C 26/00 | (2006.01) |
| C23C 28/04 | (2006.01) |
| C23C 28/00 | (2006.01) |
| H01G 4/12 | (2006.01) |

(52) U.S. Cl.
CPC .......... *C04B 35/491* (2013.01); *C04B 35/624* (2013.01); *C23C 26/00* (2013.01); *C23C 28/04* (2013.01); *C23C 28/30* (2013.01); *H01G 4/1218* (2013.01); *H01G 4/1245* (2013.01); *C04B 2235/3227* (2013.01); *C04B 2235/3232* (2013.01); *C04B 2235/3244* (2013.01); *C04B 2235/3296* (2013.01); *C04B 2235/441* (2013.01); *C04B 2235/443* (2013.01); *C04B 2235/449* (2013.01); *C04B 2235/6562* (2013.01); *C04B 2235/6565* (2013.01); *C04B 2235/6584* (2013.01); *C04B 2235/768* (2013.01); *Y02T 10/7022* (2013.01)

(58) Field of Classification Search
CPC ....... C04B 35/491; H01G 4/228; H01G 4/232
See application file for complete search history.

(56) References Cited

U.S. PATENT DOCUMENTS 3,683,469 A * 8/1972 Capek ...................... H01G 4/30
156/89.12
4,853,827 A * 8/1989 Hernandez ............... H01G 4/20
361/321.4

(Continued)

OTHER PUBLICATIONS

Zou et al., "Improved dielectric properties of lead zirconate titanate thin films deposited on metal foils with LaNiO3 buffer layers," 2001, Appl. Phys. Letters 78, No. 9, pp. 1282-1284.*

(Continued)

*Primary Examiner* — Robert A Vetere
(74) *Attorney, Agent, or Firm* — Cherskov Flaynik & Gurda, LLC

(57) ABSTRACT

The invention provides a stacked capacitor configuration comprising subunits each with a thickness of as low as 20 microns. Also provided is combination capacitor and printed wire board wherein the capacitor is encapsulated by the wire board. The invented capacitors are applicable in microelectronic applications and high power applications, whether it is AC to DC or DC to AC, or DC to DC.

12 Claims, 9 Drawing Sheets

Related U.S. Application Data

(60) Provisional application No. 61/499,582, filed on Jun. 21, 2011, provisional application No. 61/183,148, filed on Jun. 2, 2009.

(56) References Cited

U.S. PATENT DOCUMENTS

| | | | | |
|---|---|---|---|---|
| 5,400,211 | A * | 3/1995 | Evans | H01G 9/08 361/275.1 |
| 5,457,598 | A * | 10/1995 | Radford | H01G 4/306 361/305 |
| 5,623,724 | A | 4/1997 | Gurovich et al. | |
| 5,745,335 | A | 4/1998 | Watt | |
| 5,800,925 | A * | 9/1998 | Ando et al. | 428/432 |
| 6,215,278 | B1 * | 4/2001 | Okamura et al. | 320/119 |
| 6,339,007 | B1 | 1/2002 | Wang et al. | |
| 6,485,672 | B1 | 11/2002 | Nomura et al. | |
| 6,829,137 | B2 | 12/2004 | Konaka et al. | |
| 7,029,971 | B2 * | 4/2006 | Borland et al. | 438/250 |
| 7,224,040 | B2 | 5/2007 | Koutsaroff et al. | |
| 2001/0021564 | A1 * | 9/2001 | Katori | H01L 28/55 438/396 |
| 2003/0107041 | A1 * | 6/2003 | Tanimoto | H01L 29/66068 257/77 |
| 2003/0117763 | A1 * | 6/2003 | Connolly | H01G 4/232 361/301.5 |
| 2005/0248910 | A1 * | 11/2005 | Merker | H01G 9/028 361/525 |
| 2006/0012945 | A1 * | 1/2006 | Doffing | H01G 9/14 361/517 |
| 2010/0302706 | A1 | 12/2010 | Ma et al. | |

OTHER PUBLICATIONS

Eric Gerritsen, et al., Evolution of Materials technology for stacked-capacitors in 65 nm embedded-DRAM, Solid-State Electronics 49 (2005), pp. 1767-1775.

Beihai Ma, et al., Chemical solution deposition of ferroelectric lanthanum zirconate titanate films on base-metal foils, J. Electroceram. (2009), 22, pp. 383-389.

* cited by examiner

A

B

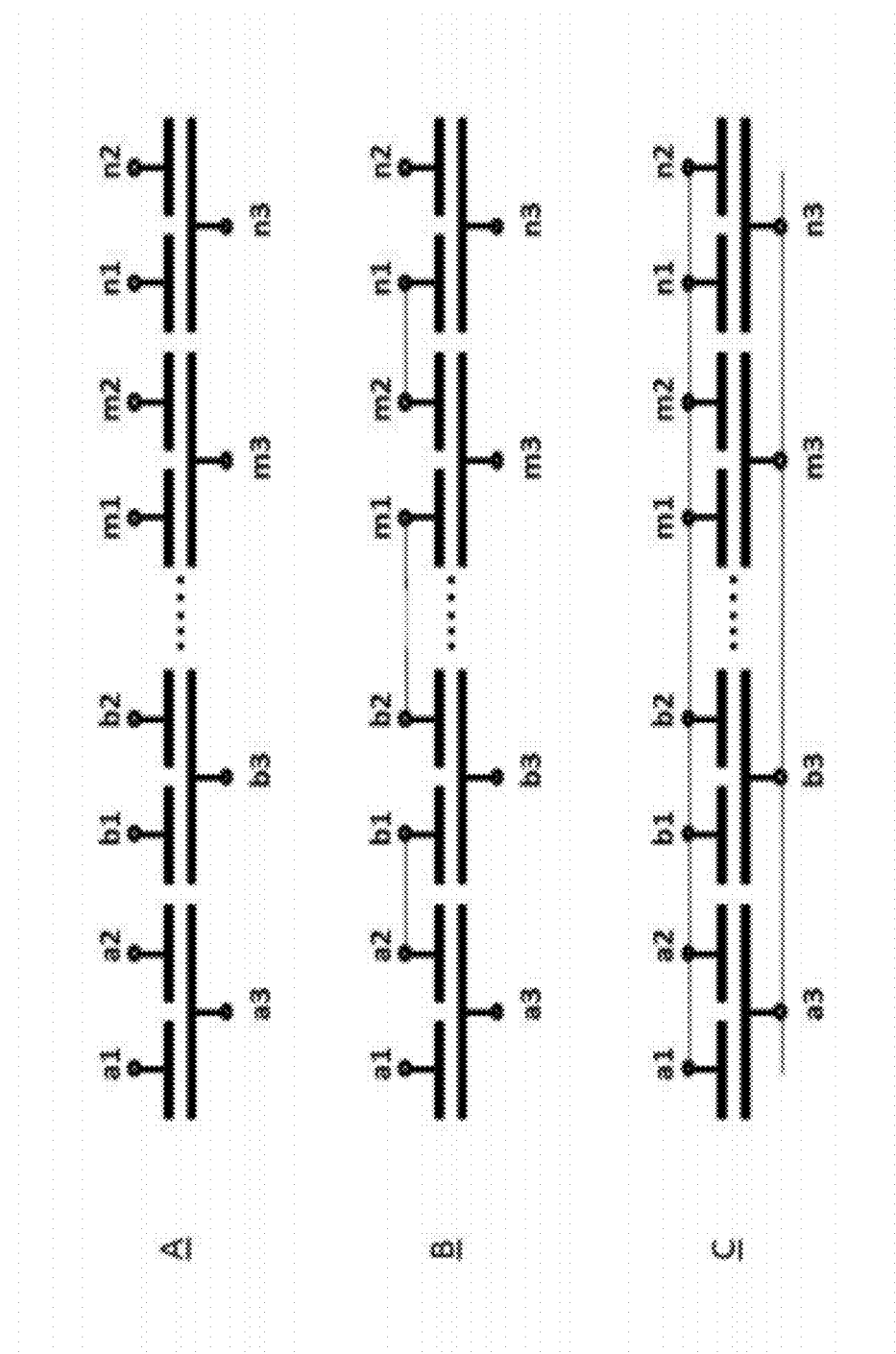

MULTILAYER CAPACITORS, METHOD FOR MAKING MULTILAYER CAPACITORS

PRIORITY

This utility patent application claims the benefits of U.S. Provisional Patent Application No. 61/499,582 filed on Jun. 21, 2011. This utility patent application further claims priority to U.S. patent application Ser. No. 12/786,940, filed on May 25, 2010, currently pending, which claims priority to Provisional Patent Application No. 61/183,148 filed on Jun. 2, 2009.

CONTRACTUAL ORIGIN OF THE INVENTION

The U.S. Government has rights in this invention pursuant to Contract No. DE-AC02-06CH11357 between the United States Government and UChicago Argonne, LLC, representing Argonne National Laboratory.

BACKGROUND OF THE INVENTION

1. Field of the Invention

This invention relates to the fabrication of capacitors. More specifically this invention relates to the architecture and method of fabricating ceramic dielectric sheets or ceramic dielectric film on metal foils (film-on-foils), to prepare multilayer capacitors for electronic applications.

2. Background of the Invention

Applications of electronics continues to explode in new areas. Miniaturization is key in some applications, such as in the fabrication of printed circuit boards. The implementation of microelectronics (with power requirements in the nanowatt range, i.e. approximately five (5) nanowatts or lower) and the implementation of power electronic devices (for example, electric vehicle propulsion systems which range from 30-60 kW) are also gaining in popularity. For example, Hybrid Electric Vehicles (HEVs), Plug-In Hybrid Electric Vehicles (PHEVs), military applications all require high power applications and management but in small packages.

Capacitors are integral parts of power electronic devices. For example, capacitors comprise about 35 volume percent, about 25 weight percent, and about 25 percent of the cost of a power inverter in electric drive vehicles.

Performances and life-cycles of these capacitors degrade rapidly with increasing temperature. Separate cooling systems are therefore required to protect inverter units, and these systems add to the costs of the entire machinery. For example, the inverter in the Toyota Prius (2004-2006 model) has a bank of three capacitors, each the size of a soft-drink can, with each capacitor rated at 85° C. and 450 volts, providing 2700 micro farads (µF) of capacitance.

There are fixed capacitors and variable capacitors. Variable capacitors often are made of interleaved plates, one immobile and the other attached to a shaft. Rotating the shaft effectively changes the area of the plates, thus changing the capacitance. Problems with such variable capacitors is that their moving parts make them less robust than their more static monolithic counterparts. Conversely, the problem with fixed capacitors is that their capacitance cannot be varied.

A need exists in the art for a capacitor which will satisfy the requirements of miniaturized electronic systems and high power electronic systems. The capacitor should accommodate different power levels simultaneously, and have a low profile so as to be embeddable into a printed circuit board. The capacitor should also withstand a wide temperature change of operation. New capacitors should free up surface space, increase device reliability, and minimize electromagnetic interference and inductance loss.

SUMMARY OF INVENTION

An object of the invention is to provide a multi-layer capacitor that overcomes many of the disadvantages of the prior art.

Another object of the invention is to provide a low profile multi-layer capacitor. A feature of the invention is that a plurality of capacitor modules, (each module comprised of dielectric film overlaying foil subunits, with a conductive layer overlaying the film) are arranged co-linearly, such that the plane defining each of the modules is parallel to the planes of adjacent modules. An advantage of the invention is that if any individual capacitors (or leads) in the stack fail, the remainder of the entire stack will continue to operate.

Still another object of the invention is to provide a multi-layer capacitor which provides for multiple voltages and capacitances without the need to move conducting plates relative to each other. A feature of the invention is the existence of a plurality of lead configurations in a single capacitor, for example two- and three-lead configurations in the capacitor. An advantage of the invention is that the configurations allow for multiple voltages and capacitances, separately or combined, depending on which leads are connected to the circuit. The allowance for multiple voltages and capacitances occurs while all parts of the capacitor remain motionless and perhaps invisible on a circuit board.

Yet another object of the present invention is to provide stacked capacitors which can operate in a myriad of environments. A feature of the invention is the use of ceramic dielectrics combined with conductive substrate. An advantage of the invention is that the resulting capacitors can operate at between approximately minus 55° C. to more than plus 200° C. without failure, preferably from between about −50° C. to about 150° C., repeatedly, and most preferably from between about −40° C. to 125° C.

Another object of the present invention is to provide a method for producing stacked capacitors. A feature of the invention is that a film on foil process is used to make a capacitor module as thin as about 20 microns, wherein the module comprises a dielectric film deposited on a first conductive substrate, with a second conductive substrate (such as film) overlaying the dielectric film. An advantage of the invention is the ensuing capacitors, comprised of stacked modules are low slung, flat shaped constructs, thereby providing an alternative to the cylinder-shaped capacitors now seen on printed wire boards (PWB). This invented configuration allows for other components to be mounted on top of or above the capacitors so as to free up PWB surface area for other componentry.

Still another object of the present invention is utilizing film-on-foil configurations to provide electronic systems with printed circuit boards having high-permittivity dielectrics embedded within the circuit boards. A feature of the invention is that the dielectrics are positioned directly underneath active devices such as motors, circuits, transformers etc. An advantage of the invention is that embedding and stacking of components shortens interconnect lengths, thereby reducing parasitic inductive losses and electromagnetic interference while enabling higher frequency operation. Another advantage is that the embedment of the invented capacitors in printed wire boards facilitates the conductance of heat away from the capacitors, along with associated thermal management systems.

Briefly, the invention provides a capacitor module having a flexibility radius of about 3 mm, the capacitor subunit comprising a first electrically conductive surface; ceramic chemically deposited on the first electrically conductive surface so as to define a ceramic layer having a surface; and a second electrically conductive surface deposited on the ceramic surface.

The invention also provides a multi-capacitor device comprised of capacitors stacked on top of each other, each of the capacitors comprising a first electrically conductive surface; ceramic chemically deposited on the first electrically conductive surface so as to define a ceramic layer having a surface; and a second electrically conductive surface deposited on the ceramic surface.

Also provided is a combination capacitor and printed wire board wherein the capacitor is encapsulated by the wire board.

BRIEF DESCRIPTION OF DRAWING

The invention together with the above and other objects and advantages will be best understood from the following detailed description of the preferred embodiment of the invention shown in the accompanying drawings, wherein:

FIGS. 9A-C are schematic depictions of three-terminal connection possibilities to vary capacitance within a single stacked capacitor, in accordance with features of the present invention.

DETAILED DESCRIPTION OF THE INVENTION

Figure 1:
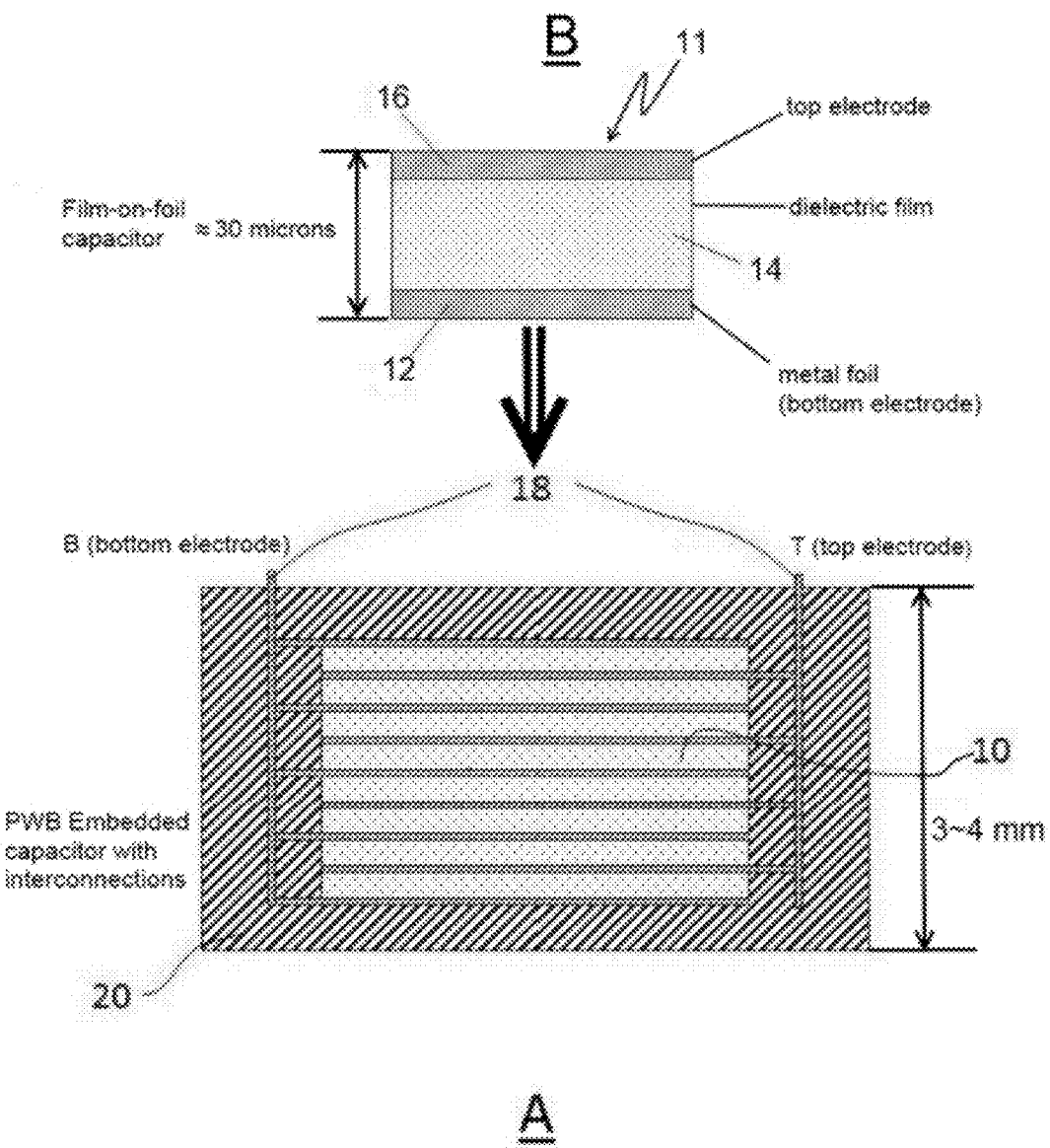
FIG. 1A-B is a schematic diagram of a stacked capacitor embedded within the confines of a printed wire board, in accordance with features of the present invention.

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The increasing need of electronic components with improved performance, greater reliability, compacted size, and reduced weight requires passive components to be stacked onto, partially embedded within, and/or completely embedded (so as to be encapsulated) within, a printed wire board (PWB). Such configurations would free up surface space, increase device reliability, and minimize both electromagnetic interference and inductance loss.

Described herein are low profile, disc-shaped monoliths, each monolith comprising a plurality of capacitor modules. The low profile feature enables embedment of the monoliths below the surface of printed circuit boards, such that the monoliths reside directly underneath active devices. Alternatively, the flat-shaped capacitors enable them to be mounted physically parallel to the surface on which they reside, and even supported by the surface without the use of leads for support. In this embodiment, substantially the entire flat surface of one side of the invented capacitor is in physical contact with the supporting surface. This flat on flat interaction also provides a means for conducting heat away from the capacitor, wherein the supporting surface acts as a heat sink.

The capacitance of a dielectric is proportional to its relative permittivity ($\epsilon r$) divided by the thickness of the dielectric material. The invention embodies the inventors' methods for fabricating stacked ceramic sheets/films on metal foils, hereinafter referred to as films-on-foils (FoFs). Details of such a process are found in U.S. Patent Application Publication number 2010/0302706 A1, owned by the instant Assignee, and incorporated in its entirety herein by reference. The inventors have applied their FoF technologies to produce ultra thin (less than 20 microns, and approximately 10 to 20 microns thick, preferably about 15-20 microns thick) capacitor modules. The modules (each module is a capacitor itself) are stacked together, as described herein, to produce a plurality of capacitors (e.g., a multi-layer capacitor) exhibiting high capacitance. Alternatively, these modules are embedded in PWBs. The film-on-foil technology is a viable approach for the fabrication of ceramic film capacitors that exhibit high capacitance density and high breakdown strength that can be used for power electronics devices with improved volumetric and gravimetric efficiencies. The ultra-thin film-on foil construction not only enables mechanical flexibility to the module, but also the capacitors which are produced when a plurality of modules are combined result in 1000 microfarad capacitance storage values in volumes as low as 0.2 liters, and typically in volumes of about 0.5 liters.

The multilayer capacitors can be used in electronic applications, as data storage devices, or combinations thereof. For example, the resulting capacitors are used in microelectronic and power electronic applications such as hybrid electric vehicles and plug-in hybrid electric vehicles. The invented architecture also allows the capacitors to be encapsulated into printed wire boards as embedded passives so as to reside substantially below the surface of the printed wire boards, as a means to further enhance compactness of circuit design.

An embodiment of the invention is a plurality of flat capacitors (eg. disk-shaped) stacked on top of each other and integrally molded to each other to form a solid monolith. The monolith design requires no moveable parts (such as conductive capacitor plates which sandwich a dielectric layer) yet the design allows variable power levels and capacitance levels. Given the flexibility of the individual capacitor modules, the modules can be preformed as non-flat structures, then combined to form a non-flat configuration. For example, the modules can be formed or shaped about a support surface or substrate to better conform to that surface. Suitable surface shapes include, but are not limited to cylinders, nacelles, housings, fuselages, transport vehicle surfaces, and any surfaces having radii of curvatures. Applicable curvature radii start at about 1 mm, typically from about 3 to 20 mm for many power electronics component configurations, and most preferably from about 5 mm to 15 mm. However, no upper end of the radii curvature is envisioned.

The capacitors resulting from the invented capacitor subunits and the method for producing the subunits are superior in function to state of the art capacitors.

Specifications for exemplary DC bus capacitors produced by the invented fabrication method include approximately a 450 V potential, approximately a 1000 microFarad (μF) capacitance, less than about 3 mΩ ESR, approximately a 250 Amp ripple current, a high dielectric constant (k) of more than 1000, and typically between about 800 and 2000, and breakdown strength (Eb) of more than about 2 MV/cm. The dielectric constant "k" is the ratio of the permittivity $\epsilon$ (as discussed herein) of a material to the permittivity of vacuum $\epsilon$.

Compactness is a salient feature of the invented capacitor architecture. This is due to the fact that dielectric is positioned on a conductive substrate via chemical solution deposition such that the dielectric is integrally molded with the conductive substrate. In an embodiment of the invented capacitor, a top electrode layer 16 (designated as numeral 16 in FIG. 1B) is thinner than the bottom electrode layer 12 inasmuch as the top layer is not necessary to confer mechanical strength to the module. Notwithstanding the foregoing, the thin profile of the bottom electrode layer compared to state of the art devices confers flexibility to the invented capacitor monolith, relative to those prior art devices.

FIG. 1A is a schematic elevation view of the invented stacked capacitor embedded into a printed wiring board. As depicted, the stacked capacitor 10 is substantially encapsulated within the bulk of a printed wiring board 20. In an embodiment of the stacked capacitor/printed circuit board combination, only leads 18 from negative and positive electrodes of the capacitor are exposed to the environment which is in contact with the exterior surfaces of the printed wiring board 20. The encapsulation of the stacked capacitor by the printed wire board provides a heat sink effect whereby the wire board wicks away heat generated within the capacitor.

FIG. 1B is an elevational view of a capacitor module, comprising a metal foil as a bottom electrode 12 and a dielectric film 14 deposited on a medially facing surface of the metal foil so as to substantially cover that entire surface in a defect free coating. In one embodiment, the film is conformal. In another embodiment, the film is noncomformal. On top of the film 14 is deposited a metal substrate as a top electrode 16. The metal substrate 16 is deposited so as to be conformal across substantially the entire upwardly facing surface of the dielectric so as to be unbroken. Relatively speaking, the metal foil 12 is typically the thickest component of the three component capacitor module. Its thickness ranges from between approximately 5 and 500 microns, preferably between about 15 microns and 400 microns, and most preferably between 50 and 100 microns.

Dielectric Detail

Capacitance density of a dielectric is proportional to its relative permittivity ($\epsilon r$) divided by the thickness of the dielectric material. (Permittivity is a measure of a material to resist the formation of an electric field within it.) The aforementioned thicknesses of the components of the capacitor modules enables the fabrication of a high capacitance density capacitor.

Thin film dielectrics of high permittivies are utilized. Suitable high permittivity (high-K) materials include perovskite ceramics of the general formula ABO3, such as crystalline lead zirconate titanate [Pb(Zr,Ti)O3, PZT], lead lanthanum zirconate titanate [(Pb,La)(Zr,Ti)O3, PLZT], lead magnesium niobate [Pb(MgI/3Nb2/3)O3, PMN], barium titanate (BaTiO3, BT), barium strontium titanate [(Ba,Sr)TiO3, BST], and combinations thereof. Some perovskites exhibit undistorted cubic structure wherein the B cation is found in a six-fold coordination surrounding by an octahedron of anions. Often, the symmetric is lowered to orthorhombic, tetragonal or trigonal structure.

Generally, the invention facilitates deposition of ceramic films on metal foils (e.g., nickel, copper, iron, silver, gold, platinum, zinc, lead, chromium, molybdenum, alloys of the aforementioned metals, and combinations thereof) to form film-on-foil sheets. The inventors found that these film on foils configurations exhibit high permittivity (greater than or equal to 1000), low leakage current density, high dielectric breakdown strength of at least about 2 MV/cm, and mechanical flexibility. It is the thin layering of the various portions of the module that confer the flexibility and capacity of the invented capacitors. In an embodiment of the invention, the dielectric layer overlays substantially just the upwardly facing surface of the foil, so as to not encapsulate the sides or other surfaces of the foil.

In an embodiment of the invention, high-permittivity lead lanthanum zirconium titanate (PLZT) ceramic dielectric films are deposited on base metal foils by a chemical solution deposition technique as disclosed in the aforementioned published patent application.

The dielectric layer 14 averages between about one half of a micron and 20 microns, and preferably between about 1 micron and 10 microns. In an embodiment of the invention, thin films (e.g. having thicknesses of between about 0.5 μm and 10 μm) of these dielectrics are deposited on base metal foils, such as nickel and copper, to form film-on-foil sheets.

The top layer 16 ranges between about 10 nanometers and a half micron in thickness, and preferably between 100 nm and 200 nm in thickness.

FIG. 2A-D is a schematic representation of the process for producing a capacitor module. The module 11 comprises the three layer configuration discussed supra, but with the addition of leads 18 and an electrically insulating coating 22.

In an embodiment of the module, the insulating coating 22 is a polymer-based material that is applied after the module, depicted in FIG. 1B, is constructed, but before leads 18 are added to the conductive plates (i.e, bottom electrode 12 and top electrode 16). In this embodiment, the coating 22 encapsulates all exterior surfaces of the module, but for the downwardly facing (laterally facing) surface 13 of the bottom electrode 12, and a lead attachment region 17 of the top electrode 16. The lead attachment region is defined by a mask 24 placed over the region prior to deposition of the insulating coating.

Exemplary material for use as insulating coating is any composition (preferably flexible), including, but not limited to Kapton tape, elastoplastic based coatings such as Dow Corning Dispersion 1-2620, silicone based solvent-less conformal coatings such as Dow Corning 3-1753 (one part RT cure), and combinations thereof. Any electrically insulating coatings which have melting temperatures above about 200° C. are suitable. In an embodiment of the invention, coatings that can withstand temperatures from minus 40° C. to plus 150° C. are preferred. The coatings are applied per manufacturer's instruction. For example, liquid-phase materials may be applied via spray deposition.

The aforementioned liquid-phase coating materials are also a means for binding together a plurality of stacked capacitor modules into a monolith. For example, in an embodiment of the stacked configuration, substantially all modules are treated with liquid phase binder. (In another embodiment, the first and last modules in a stack are not integrally molded with the modules positioned between them.) Once the coating and subsequently the leads (discussed infra) are applied, the modules are assembled and pressure applied in an axial direction relative to the ends of the stack so as to facilitate binding of the modules to each other into a seamless, pore-less monolith. This stacking construction process results in the subunit capacitors being integrally molded to each other.

In other embodiments, not all of the modules are coated with the electrically insulating/binding resin. For example, the end modules of a stack may be treated with Kapton tape to confer electrical insulation. Kapton tape does not have the irreversible binding characteristics of its liquid phase resin counterparts discussed supra. This will allow these end modules to be removably attached to the stack, thereby facilitating fine tuning of the capacitor.

Leads Detail

Figure 2:
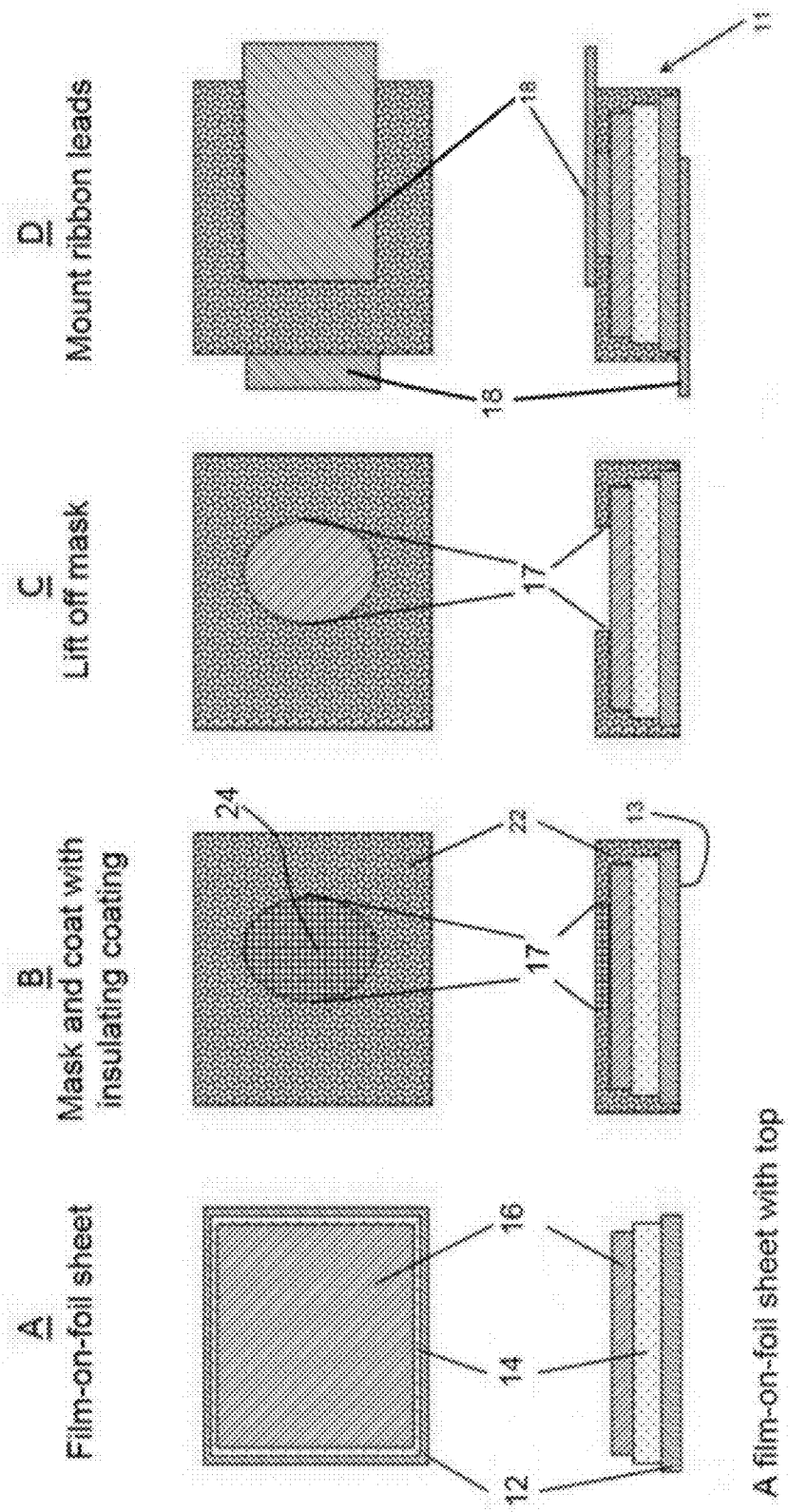
FIG. 2A-D is a schematic of a process for making a dielectric module, in accordance with features of the invention.

After the coating has been applied and allowed to dry, cured or otherwise molded with the underlying capacitor module 11, the mask 24 overlaying the top electrode lead attachment region 17 is removed, thereby exposing that region (as shown in FIG. 2C). Leads are then attached to the outwardly facing surface 13 of the bottom electrode and the lead attachment region 17. This part of the fabrication process is illustrated in FIG. 2D.

Electrically conductive material is suitable for the conducting leads. Exemplary conducting leads are copper or aluminum foils which are attached (examples are film deposition, conductive paste printing, plating, or attaching thin ribbons using conductive epoxy) to the top 16 and bottom 12 electrodes. Lead attachment is effected by any suitable means which will not compromise the capacitor structure. As such, conductive paint, conductive epoxy, ultra sonic welding, pressure-induced grain boundary sliding and combinations thereof are all suitable attachment means.

The inventors have further optimized the design of the stacked capacitor by incorporating ribbon-shaped instead of wire-leads. As discussed above, ribbon-leads provide a means for minimizing the thicknesses of the stacked configuration. Also, ribbon leads provide a means for minimizing equivalent series inductance (ESL) of the stacked structure.

Figure 6:
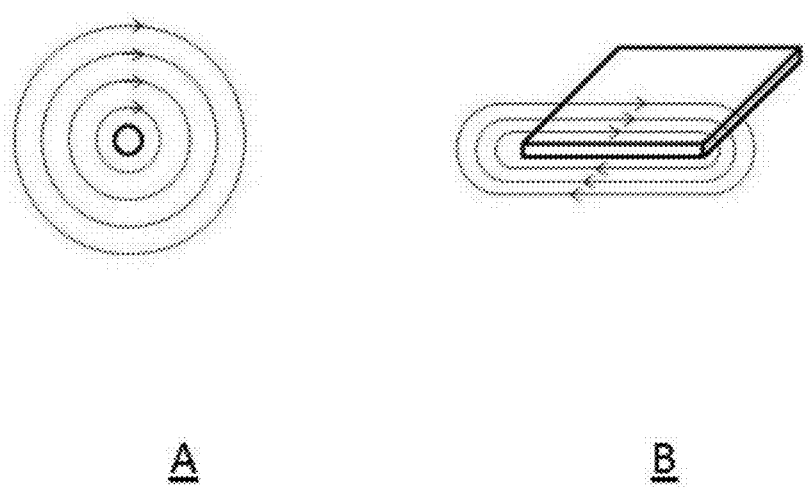
FIG. 6A-B is a schematic diagram of magnetic flux fields about a wire conductor and a ribbon conductor.

Whereas a wire lead has magnetic fields of force circumscribing its diameter (FIG. 6A), a wide, flat ribbon-shaped electrode has magnetic fields of force extending along its width, as depicted in FIG. 6B. This results in a lower magnetic field strength across the ribbon lead versus the wire shaped lead. As such, changes in the magnetic field of a ribbon lead (those changes resulting from varying current) will induce a relatively smaller emf in the circuit compared to the emf induced in wire leads.

Figure 3:
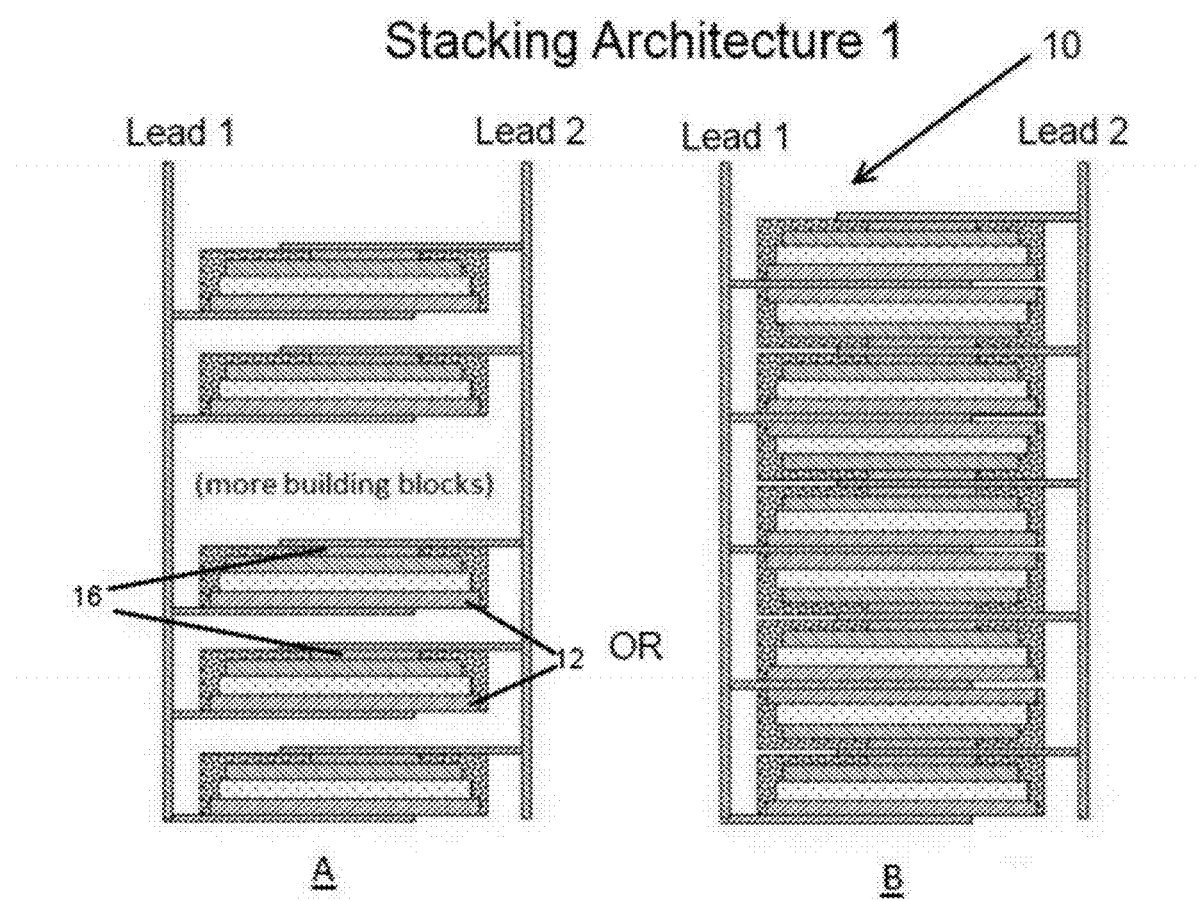
FIG. 3A-B is a schematic of a first capacitor stacking architecture, in accordance with features of the present invention.
Figure 4:
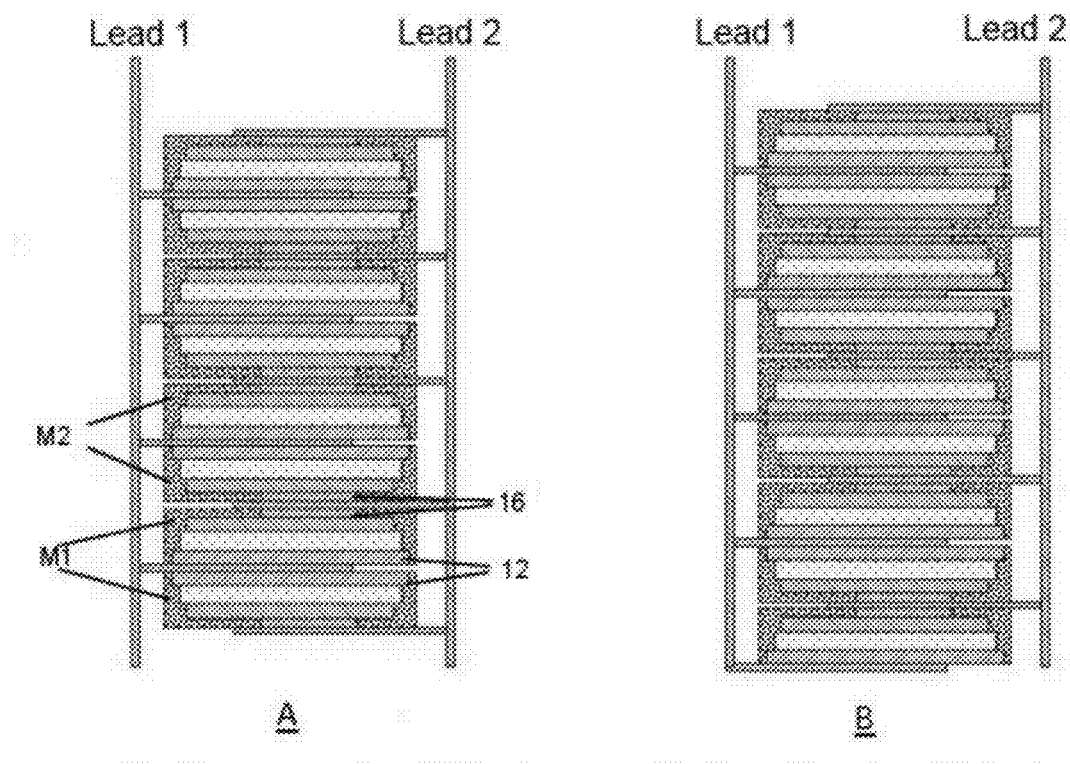
FIG. 4A-B is a schematic of a second capacitor stacking architecture, in accordance with features of the present invention.

Embodiments of the invention comprise three different stacking architectures—two architectures (FIGS. 3 and 4) which use two-lead configurations, and a third architecture (FIG. 5A) which uses a three-lead configuration. A first lead electrically connects all bottom leads together while a second lead electrically connects all top leads together. In FIG. 3B, which shows more a compact configuration of capacitors compared to FIG. 3A, capacitors positioned immediately adjacent to each other are flipped so that the top electrode of a capacitor superior in position to the immediately inferior capacitor contacts the top electrode of the inferior capacitor. This requires the superior capacitor to be upended. The lead 18 is positioned between the two electrodes.

FIGS. 4A-B depict stacked capacitor configurations wherein two adjacent modules M1 in a stack are positioned such that their two bottom electrodes 12 are medially facing each other so as to oppose each other. Positioned intermediate the two bottom electrodes is a first lead in electrical communication with the opposing bottom electrodes. The laterally facing surfaces of this first two-module construct comprise the top electrodes 16, which in turn are electrically linked with all other top electrodes in the stack. Immediately adjacent the first two-module construct is a second two module construct M2 electrically communicating with the first two-capacitor construct. This electrical communication is occurring via a top electrode 16 of the first two-module construct in opposition to a top electrode of a second two-module 1 construct. A lead 18 is positioned between these two top electrodes so as to electrically link the top electrodes.

Figure 5:
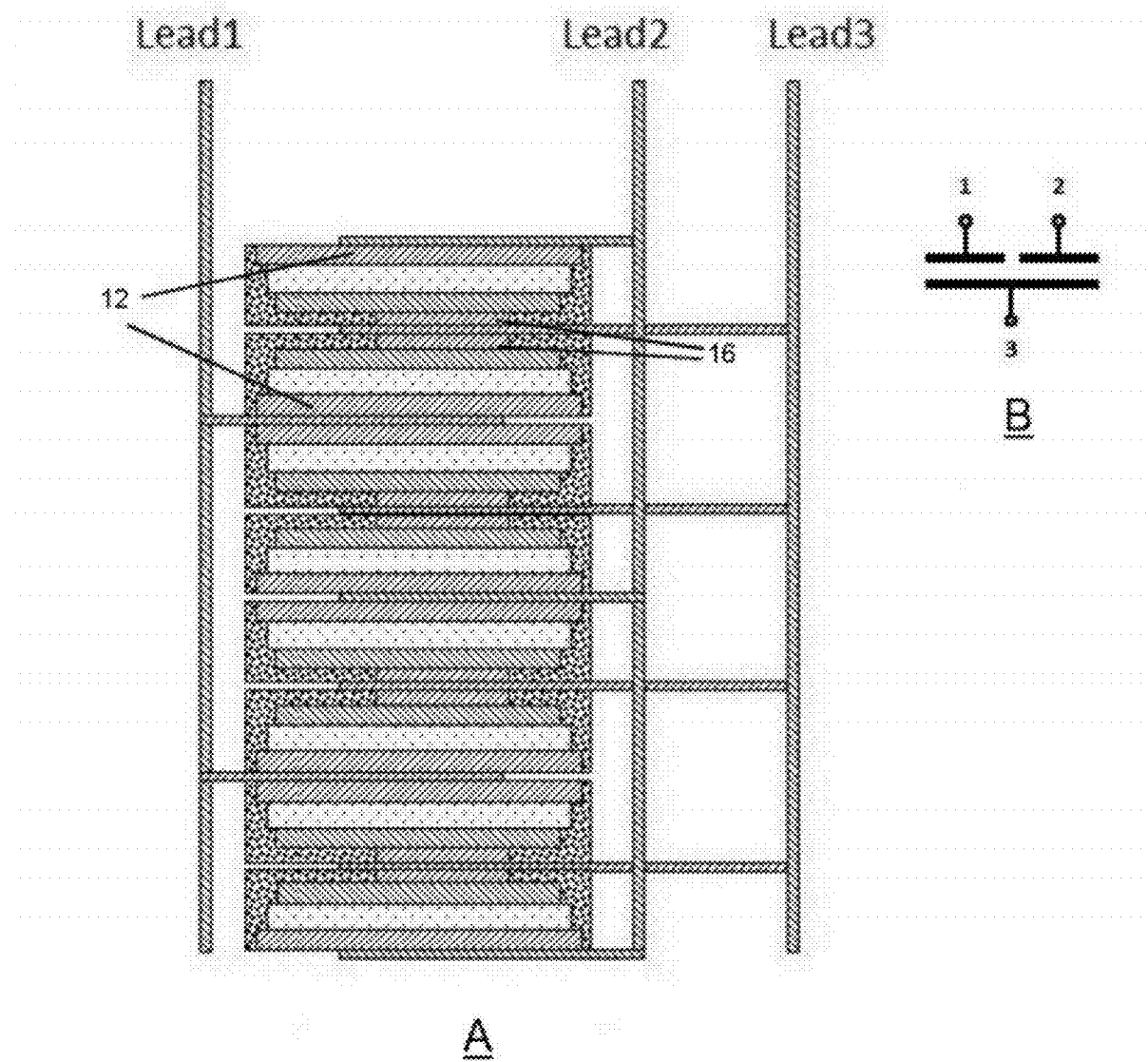
FIG. 5A-B is a schematic of a 2 and 3 lead iteration of a stacked capacitor configuration, in accordance with features of the present invention.

The three lead configuration (FIG. 5A) allows for multiple voltages and capacitances within the same capacitor, depending on which leads are connected to the circuit. As can be discerned upon viewing FIG. 5B, introduction of a third lead can double the capacitance of the device. As depicted in FIG. 5A, Lead 1 establishes electrical communication with less than all of the bottom electrodes 12, the remaining bottom electrodes in the stack communicating with each other as opposing surfaces. The addition of a third lead (Lead 2) results in all remaining bottom electrodes 12 accessed via a lead. If C0 is the capacitance between leads 1 and 3, then a capacitance of 2C0 can be achieved if leads 1 and 2 are first interconnected so as to oppose lead 3.

The invented three lead system provides a means to add to the capacitance of the capacitor, that addition dependent upon the total surface area defined by the interconnected leads. An advantage of an embodiment of the invented three lead capacitor compared to the prior art is its extremely low profile, facilitated in part with the relative thickness of each lead (less than about 50 microns in thickness, preferably less than 25 microns, and most preferably more than about 5 but less than 20 microns in thickness.). For example, exemplary lead thickness is about 17 microns which is conferred by half ounce copper foil, the material of choice for these leads. Aside from copper, other conductive substrates are also suitable as lead material.

A reason for the low profile of the invented multi-capacitor stack is the interleaving of the leads between capacitor modules forming the capacitor stack. This interleaving results in the leads extending laterally from the stack so that their flat surfaces are parallel, and in some instances co-planar with, the conductive substrates forming the electrodes of the capacitors.

The challenge for stacking film-on-foils to establish parallel connections is to insulate the electrodes of opposite polarity with sufficient electric breakdown strength. Fabrication steps discussed herein teach the deposition of electrically insulating coating onto, and attaching electrical leads to the top and bottom electrodes of a stacked capacitor. Several stacking architectures are discussed, including bottom electrode to top electrode (FIG. 3A), or bottom electrode to bottom electrode (FIG. 3B, FIG. 4A-B) configurations. In both of these architectures, the top electrode of all FoF parts are connected together to lead 2, and the bottom electrodes are all connected together to lead 1. Masking can be achieved either by using masking tape of appropriate shape/size, shadow masking, or by photolithography that is used in the semiconductor industry.

The thickness of the metallic substrate along with thickness of the dielectric are determined by the design constraints of the componentry. However, exemplary thicknesses of the metallic substrates range from between about 20 micrometers to several millimeters. Exemplary ceramic dielectric films range from about a half a micron to 5 microns. The invented stacking structure functions within a range of between about minus 40° C. and plus 200° C.

Capacitor Module
Production Detail

Electrically conductive substrates such as metal (or alloy) foils with smooth surface finishes were cleaned using appropriate solvents. Then, a dielectric film is deposited on the foils. In embodiments of the invention, for example when copper, gold foils and platinum coated silicon are utilized as electrodes, the film is deposited directly on the foils.

In an embodiment of the invention, an electrically conductive buffer film is deposited on polished foils, for example nickel foils, prior to deposition of a dielectric film. This buffer film provides a means for preventing diffusion of conductive metal from the foil and into the dielectric film. In other words, the buffer film provides a means for preventing inadvertent doping, or degradation of the insulating qualities of the dielectric film.

A suitable thickness of buffer film is one which prevents diffusion of moieties from the foil to the dielectric layer. Generally, the buffer film is between about 0.05 and 1 microns thick, preferably about 0.1 and 0.5 microns thick, and most preferably about 0.4 micron thick. In an embodiment of the invention, the buffer film is confined within the capacitor module and not exposed to the exterior of the module or present on the exterior of the module. In another embodiment of the invention, the buffer film is exposed to the exterior of the module.

In preparation of the buffer film, precursor solutions of $LaNiO_3$ and PLZT were prepared by a 2-methoxyethanol synthesis route, as described in the 2010/0302706 A1 publication heretofore incorporated herein by reference which discussed method of depositing PLZT dielectric films on copper foils. Details of preparation of the buffer film and of the $LaNiO_3$ solution are found in *J. Electroceram* 22, 383-389, (2009), the entirety of which is incorporated by reference. In one embodiment of the process, $LaNiO_3$ solution was first spin-coated on Ni substrates, pyrolyzed at about 450° C. for about 5 minutes and annealed at about 625° C. for about 2-5 minutes. This process was repeated about 3-5 times to build a 0.4 micron thick buffer film.

Subsequently, PLZT precursor solution was spin-coated on the $LaNiO_3$-buffered substrates, pyrolyzed at about 450° C. for 10 minutes and annealed at about 650° C. for about 2-5 minutes. This process was repeated to build the desired thickness. All annealing and pyrolysis were done in the air for the films deposited on Ni foils. The inventors found that the spin coating operation enables per layer thicknesses of the dielectric of between 0.05 and 2 microns.

No $LaNiO_3$ was used while fabricating PLZT films on Cu foils. All annealing and pyrolysis in the fabrication of these copper-containing capacitor modules and the resulting stacked configurations were done in inert atmosphere, such as argon or nitrogen atmosphere.

Platinum electrodes were deposited on the PLZT films by electron beam evaporation.

Figure 7:
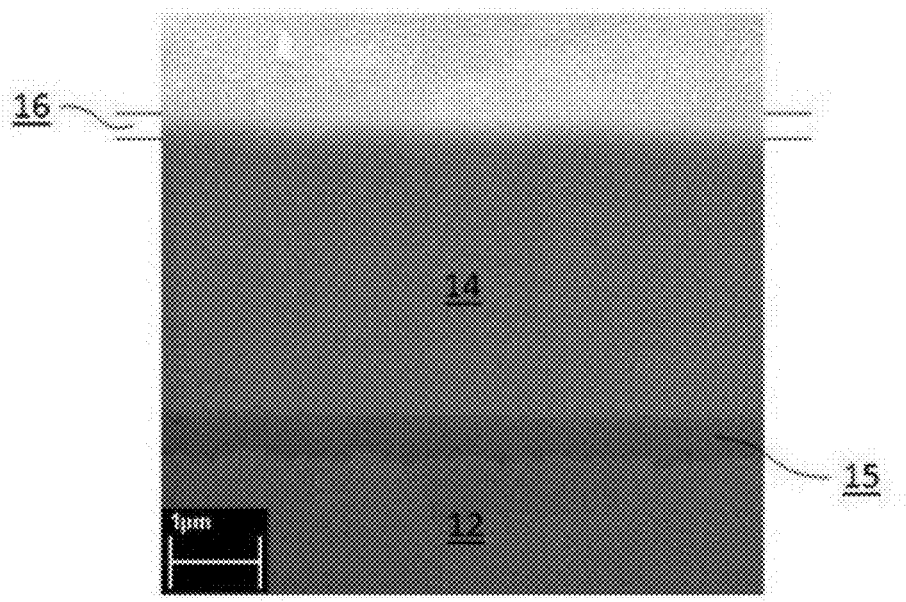
FIG. 7 is a photomicrograph of a cross section of a capacitor formed using film on foil technology, in accordance with features of the present invention.

FIG. 7 is a photomicrograph of a capacitor module. The first electrode 12, comprising nickel foil is approximately 1.5 microns thick. An LNO buffer film 15 overlaying the nickel is approximately a half micron thick. A PLZT dielectric layer 14, overlaying the buffer film is approximately 4 microns thick. A second electrode layer 16 (in this instance platinum), substantially overlaying the dielectric film is approximately 1 micron thick. Embodiments of the invention include those where the first electrode is substantially thicker than the second electrode. This enables handling of the capacitor without fear of damage. The invented deposition film on foil technique used to construct the capacitor modules further enhances the handling characteristics of the module such that no additional support substrate is needed to keep the capacitor from delaminating, crumbling, or otherwise coming apart.

Figure 8:
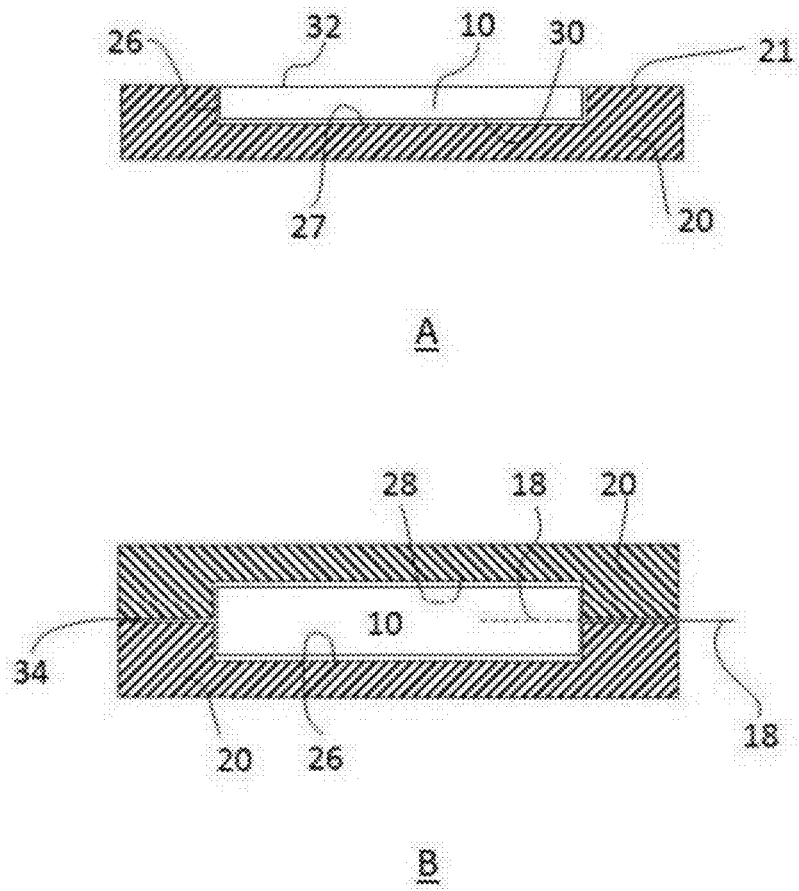
FIGS. 8A-B depict encapsulation configurations of capacitor/printed wiring board combinations, in accordance with features of the present invention.

FIGS. 8A and 8B depict methods for embedding or encapsulating the invented stacked capacitor 10 into a printed wiring board 20. A method for embedding the stacked capacitor into a board is depicted in FIG. 8A. A surface 21 of the board 20 defines a honed or hollowed out region or cavity 26 defined by an indented upwardly facing first surface 27 of the board. An embodiment of the embedded configuration is where the cross section of the cavity 26 is complimentary in shape to the cross section of the stacked capacitor 10.

The capacitor is held in place within the region either by friction fit or a high thermal conductivity epoxy resin. One suitable commercially available resin is Durapot 865 available from Cotronics Corporation of Brooklyn, N.Y. Either a friction fit or the resin application allows rapid heat transfer from the capacitor to proximal regions of the printed wire board. As depicted in FIG. 8A, the stacked capacitor nests within the printed wire board such that a downwardly facing surface 30 of the capacitor resides below the surface 21 of the printed wiring board while an upwardly facing surface 32 of the capacitor is positioned coplanar with the surface 21. Alternatively, the upwardly facing surface 32 of the capacitor can be positioned above or below the surface 21 of the printed circuit board 20.

FIG. 8B depicts a method for complete encapsulation of the stacked capacitor 10. Two printed circuit boards 20 (for example, one positioned superior to the other) sandwich or otherwise encapsulate the stacked capacitor 10. As such, the capacitor is positioned in between the two printed circuit boards. The circuit boards each define countersunk surfaces 26 and 28, and when these surfaces oppose each other, a cavity is formed which is approximately complimentary to the cross section of the stacked capacitor to be encapsulated. Means for affixing the capacitor within the cavity is as described supra.

The opposing surfaces of the two printed wiring boards define a gap 34, this gap adapted to receive leads 18 coplanarly extending from the stacked capacitor. Such embedment of the stacked capacitor results in substantial encapsulation of the capacitor by the PWB, so as to confer invisibility of the capacitor to exterior portions of the PWB.

FIGS. 9A-C depict varying lead connection configurations. FIG. 9A shows a number, x, of three lead capacitors none of which are in electrical communication with each other.

FIG. 9B depicts a least capacitance situation among all of the x number of three lead capacitors. In this situation, lead number 1 of a film-on-foil module is connected to lead number 2 of an adjacent module. None of the third leads of the adjacent modules are interconnected. A capacitance of $C_0/2x$ is achieved.

FIG. 9C depicts a maximum capacitance situation among all of the x number of three-lead capacitors. In this configuration, all upper plates a1, a2, b1, b2, m1, m2, n1, and n2, (representing say the positive charge collectors) of all three-lead capacitors within a stack containing x number of capacitors are electrically connected. In addition, all lower plates a3, b3, m3, n3, (representing the negative charge collectors) within the stack are electrically connected. This yields a capacitance of $2 \times C_0$.

EXAMPLE

Fabricated PLZT on Ni foils with k≈700 & DF≈0.07 at −50° C.; k≈1300 and DF≈0.08 at room temperature; and k≈2200 and DF≈0.06 @ 150° C.

Demonstrated film-on-foils with breakdown strength Eb>2.6 MV/cm, and leakage current density lleakage<$10^{-8}$ A/cm$^2$.

Dielectric constant increased and loss factor slightly decreased when temperature increased from 25° C. to 150° C., both causing ESR to decrease.

Measured energy density≈85 J/cm$^3$ in a ≈3 μm-thick PLZT film-on-foil.

Demonstrated capacitance≈5 μF and DF≈0.1 at 1 kHz with a 0.7-μm-thick PLZT film-on-foil capacitor with 20-mm-dia Pt top electrode.

Fabricated PLZT on Cu foils with K increased from ≈1100 to ≈1400 and loss factor decreased from 0.07 to 0.05 when temperature was increased from 25° C. to 150° C., Breakdown strength (Eb)>2 MV/cm (where M=$10^6$), and lleakage<10-8 A/cm$^2$.

Film-on-foil dielectrics were thermally cycled (≈1000 cycles) between −50° C. and +150° C. with no measurable degradation in capacitance.

PLZT film-on-foils have potential to reduce size, weight, and cost, increase capacitance density, and enable high temperature operation, for use in power electronic systems in hybrid electric vehicles.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A capacitor device comprising:
   an array of individual thin-film capacitor units wherein each unit includes a first electrode and second electrode separated by a dielectric layer;
   a first thin lead in electrical communication with first electrodes in the array of individual thin-film capacitors;
   a second thin lead in electrical communication with second electrodes in the array of individual thin-film capacitors; and
   a liquid phase binder to coat the capacitor array, wherein said binder integrally molds the component thin-film capacitors to each other; wherein a dried coating formed by the liquid phase binder encapsulates exterior surfaces of the device including portions of a top surface of the device except for external lead attachment regions;
   wherein all first electrodes of the stacked capacitors are interconnected with the first lead and all second electrodes of the array of thin-film capacitors are interconnected with the second lead wherein within the capacitor device forming a monolith, each pair of the first electrodes are adjacent to one another with the first lead in communication with each pair of first electrodes, and each pair of second electrodes are adjacent to one another with the second lead in communication with each pair of second electrodes; wherein only the external lead attachment regions protrude from the capacitor monolith which forms a pore-less monolith.

2. The device recited in claim 1 further comprising a buffer layer between the first thin lead and the dielectric layer of the capacitor.

3. The device as recited in claim 2 wherein the buffer layer comprises an electrically conductive film deposited on the first thin lead.

4. The device as recited in claim 1 further comprising three external leads extending from the capacitor monolith.

5. The device as recited in claim 4 wherein the first external lead is electrically connected to a first region of the capacitor construct, the second external lead is electrically connected to a second region of the capacitor construct, and the third external lead is electrically connected to a third region of the capacitor construct, wherein the first region comprises less than half of the first electrodes, second region comprises all second electrodes, and the third region comprises a remainder of the first electrodes; wherein each region is electrically insulated.

6. The device as recited in claim 1 wherein the array of individual thin-film capacitors forms a stack having a first end and a second end and at least one of the thin leads emanates from the stack between the first end and the second end.

7. The device as recited in claim 6 wherein a first capacitor defining the first end of the stack includes an exposed lead attachment region and a second capacitor defining the second end of the stack is removably attached to the exposed lead attachment region of the first capacitor.

8. The device as recited in claim 1 wherein the capacitors comprising the capacitor array are integrally molded to each other to form a monolith, wherein the dried flexible binder encapsulates exterior surfaces of the device, including at least a portion of a top surface of each capacitor forming the monolith.

9. The capacitor as recited in claim 8 wherein the monolith is between about 20 and 50 micrometers thick.

10. The device as recited in claim 1 wherein the capacitor has a radius of flexibility of about 3 mm.

11. The device as recited in claim 1 wherein each capacitor comprising the capacitor array is flexible so as to allow the device to conform to an adjacent surface having a radius of flexibility of as low as about 1 mm.

12. The device as recited in claim 1 wherein at least one of said capacitors has a thickness of less than 20 microns.

* * * * *